United States Patent [19]

Volk

[11] Patent Number: 4,886,179

[45] Date of Patent: Dec. 12, 1989

[54] REUSABLE CONTAINER FOR A PIECE OF PIZZA PIE OR OTHER FOOD PRODUCT

[76] Inventor: William T. Volk, R.R. 2, Highview Dr., Wading Diver, N.Y. 11792

[21] Appl. No.: 269,120

[22] Filed: Nov. 9, 1988

[51] Int. Cl.$^4$ .............................................. B65D 85/36
[52] U.S. Cl. ................................... 220/23.4; 206/508; 220/23.6; 426/109
[58] Field of Search ............... 206/508, 540, 542, 545, 206/546, 821, 551; 220/23.2, 23.4, 23.6; 426/109, 113, 114, 124, 128

[56] References Cited

U.S. PATENT DOCUMENTS

| | | | |
|---|---|---|---|
| 2,506,256 | 5/1950 | Waldo | 206/551 |
| 2,525,337 | 10/1950 | Brooks et al. | 206/551 |
| 3,117,692 | 1/1964 | Carpenter | 220/23.6 |
| 3,335,846 | 8/1967 | Mills | 206/551 |
| 3,837,330 | 9/1974 | Lanigan | 426/109 |
| 4,373,636 | 2/1983 | Hoffman | 206/551 |
| 4,422,559 | 12/1983 | Landis | 220/306 |
| 4,466,552 | 8/1984 | Butterworth | 220/306 |
| 4,468,424 | 8/1984 | Cartwright | 426/109 |
| 4,545,487 | 10/1985 | Asmus | 220/23.6 |
| 4,605,579 | 8/1986 | Armento et al. | 426/124 |

FOREIGN PATENT DOCUMENTS 0460545 10/1949 Canada .............................. 220/23.4
2855564 7/1980 Fed. Rep. of Germany ..... 220/23.4

Primary Examiner—Jimmy G. Foster
Attorney, Agent, or Firm—Michael I. Kroll

[57] ABSTRACT

An interlockable reusable container for a food product, especially for a leftover piece of pizza pie, made of a thermoplastic material comprising a pie-shaped base, two substantially flat side walls attached to the base meeting in a common vertex, one of these side walls having an exterior tongue member and the other having an exterior groove member which are shaped so that the reusable container is laterally interlockable with another reusable container, a rear wall attached to the side walls and the base and a removable lid having a lid panel which rests on the side walls and a plug member which fits in the top opening of the reusable container when the lid is in place on the container. The lid panel and base may have a similar tongue and groove system so that the reusable containers can be stacked compactly in stable vertical stacks. An optional ceramic heat retention plate having a plurality of feet members shaped to just fit in the reusable container resting on the base of the reusable container can be provided.

2 Claims, 2 Drawing Sheets

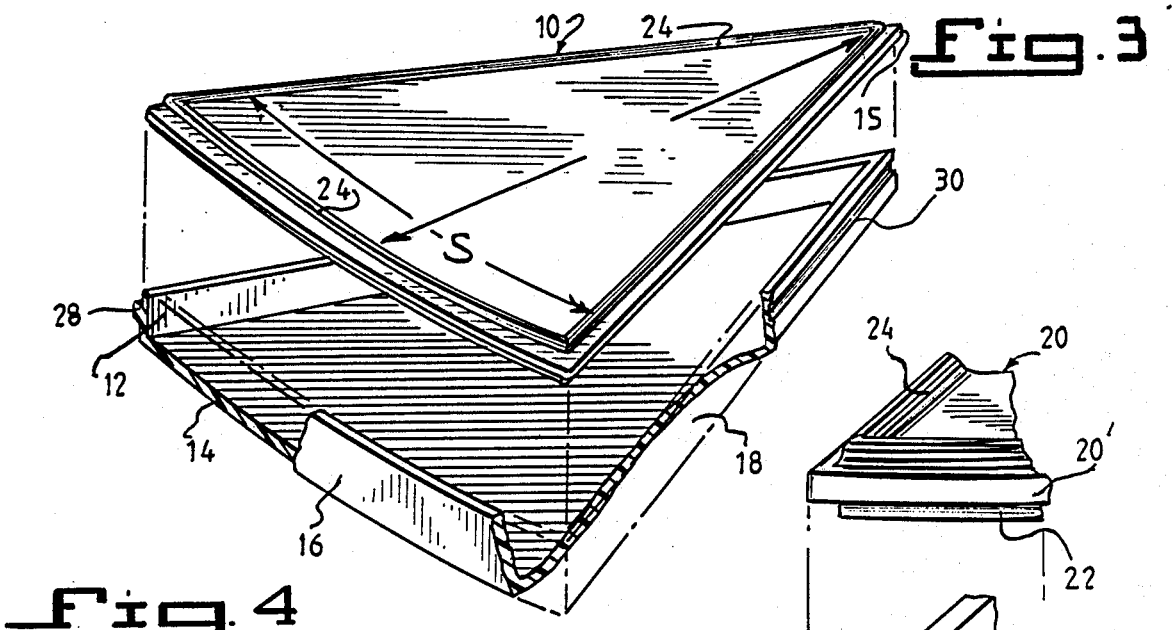
Fig. 3
Fig. 4
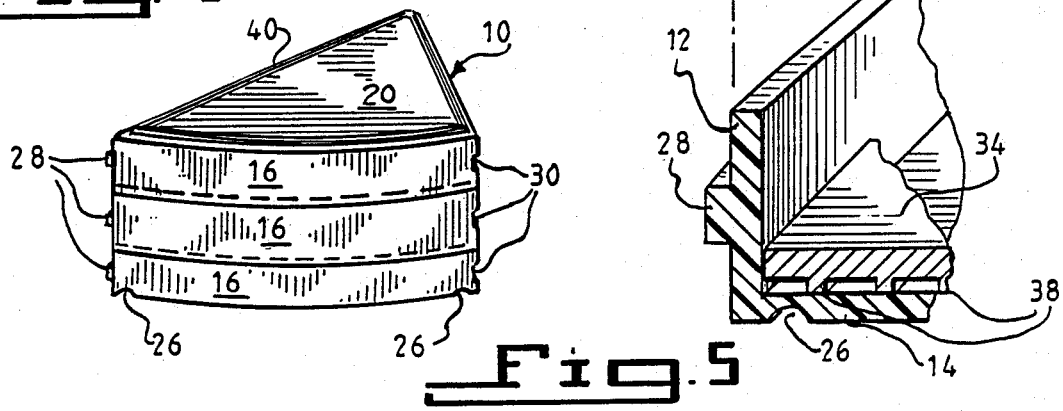
Fig. 5
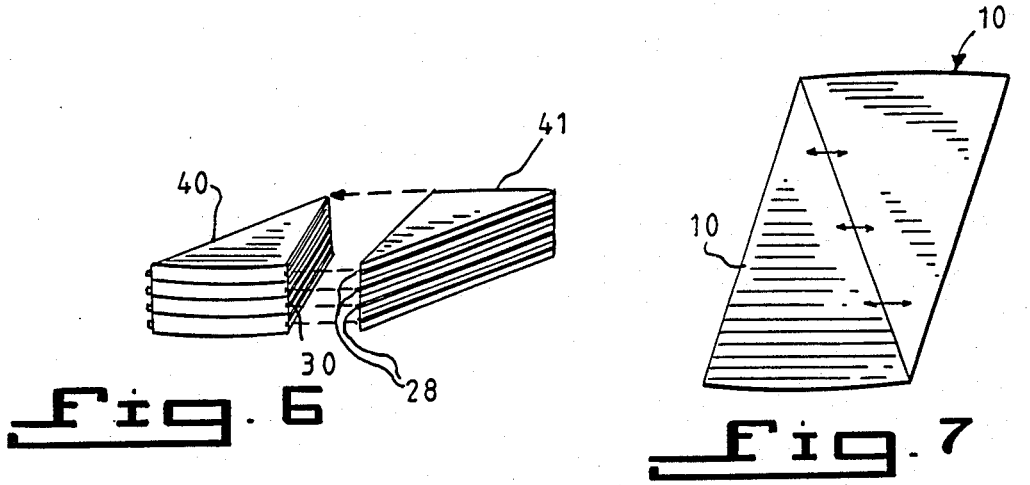
Fig. 6
Fig. 7

REUSABLE CONTAINER FOR A PIECE OF PIZZA PIE OR OTHER FOOD PRODUCT

THE FIELD OF THE INVENTION

Our invention relates to a reusable container for a food product and, more particularly, to a reusable container especially useful for storing and reheating a piece of leftover pizza pie.

THE BACKGROUND OF THE INVENTION

Most pizza lovers have experienced the frustration of reaching in the refrigerator to unwrap a piece of leftover pizza which has had its aluminum foil wrapping torn and has become stale, unpalatable or worse as a result. These leftover pizza pie pieces of course result from ordering a fresh pizza pie but being unable to consume it entirely at a single meal.

However the piece of pizza pie can not only be wrapped in aluminum foil or other foil wraps but it can be stored in any of a great variety of containers available currently. However the shape of a piece of pizza pie is somewhat unusual for a food product, being that of a sector of a circle. The usual containers with a rectangular cross section are inefficient containers for storing a piece of pizza pie. This is particularly true when a number of leftover pieces are to be stored in a number of containers either in a restaurant or as a result of a home party. In that case use of a typical parallelepiped container for a each piece would result in a considerable consumption of space in the refrigerator in which the pieces are stored. Furthermore when it is stored in a common parallelepiped container the piece of pizza pie is not easily recognized among other similar containers and may sit in the refrigerator substantially longer than if it were stored in a distinctive container.

When a number of leftover pieces are to be stored simultaneously the conventional containers do not make any provision for linking or attaching the containers for ease of handling and for loading and unloading the refrigerator or other storage unit.

Another problem is that many containers do not allow reheating the leftover pieces of pizza or other food efficiently without excessive cleaning work or other wasted effort.

It is an object of our invention to provide an improved reusable container for pieces of food which are shaped like a sector of a circle, especially for a piece of leftover pizza pie.

It is another object of our invention to provide an improved reusable container for a piece of pizza pie which fits the shape of the piece of pizza more exactly than any of the conventional containers so that its use saves storage space, especially when a large number of leftover pieces are stored in a refrigerator and is particularly distinctive so that the piece of pizza pie is not lost among a large number of similar containers in storage.

It is a further object of our invention to provide a special container for storing a leftover, sector-shaped piece of pizza pie or other food which saves storage space and which provides particularly easy loading and unloading of a storage unit or refrigerator when a number of pieces of pizza pie are being stored.

It is yet another object of our invention to provide a special container for storing a leftover, sector-shaped piece of pizza pie which interlocks with other similar storage containers and has means for providing for an easy and efficient reheating of a piece of pizza pie stored in it.

SUMMARY OF THE INVENTION

According to our invention an interlockable reusable container for a food product, especially for a leftover piece of pizza pie, comprises a base shaped like a sector of a circle, two substantially flat side walls attached to the base meeting in a common vertex, a rear wall attached to the side walls and the base, an exterior tongue member or tongue piece and an exterior groove member or groove portion shaped to engage the tongue member or tongue piece on another of the reusable containers so that the reusable containers may be interlocked to save space in storage.

This reusable container may be provided in a variety of radii and arc lengths corresponding to the differences in the dimensions of the standard pie piece-shaped pieces of pizza or other food products. When the reusable containers according to our invention are interlockable laterally and vertically a large number of leftover pizza pie pieces can be stored or transported in a comparatively compact space. This is useful for either alleviating refrigerator overcrowding at home or in commercial situations.

A removable lid which rests on the side walls when used to cover the container may be provided. It comprises a lid panel which rests on the side walls and a plug member under the lid panel which fits snugly in the top opening of the reusable container when the lid is in place on the container.

For efficient vertical stack formation the lid panel can have an exterior peripherally running vertically extending tongue piece and the base can have a corresponding exterior peripherally running groove portion. By "exterior" we mean here on the outer surface of the lid panel or the base. The tongue piece and the groove portion are formed so that two or more of the reusable containers can be interlocked and stacked vertically to form stable vertical container stacks.

For lateral interlocking of containers an exterior groove member is provided extending along one side wall and an exterior tongue member is correspondingly provided extending along the other of the sides walls. The groove member is conformed so that the reusable container can be laterally interlocked with the tongue member of another reusable container to form a substantially flat package capable of holding two pieces of pizza pie. Of course more than two containers may be interlocked in this way. With pieces of pizza pie cut in the standard way with eight slices per pie, the corresponding eight reusable containers can be interlocked to form a completely circular flat package useful for storage or transport.

A thermoplastic material which withstands a moderate heating necessary to warm a leftover food product for palatability and efficient digestion may be used to make the reusable containers of our invention. The thermoplastic material should be chosen however so that the container can be heaated in a microwave oven.

A heat retention plate having a plurality of feet members shaped to just fit in the reusable container resting on the base of the reusable container with the feed members can also be provided. This heat retention plate is useful when a leftover piece of pizza is to be heated in a microwave oven for example. When the heat retention plate is made of a ceramic material it is easily cleaned and does not conduct heat away from the piece of pizza rapidly.

The reusable containers according to our invention are primarily for storing, transporting and reheating leftover pieces of pizza pie, but can be useful for other food products providing a versatile compact storage system for food products. They are also easily distinguished in the refrigerator because of their distinctive shape thus making it less likely that their contents is forgotten.

BRIEF DESCRIPTION OF THE DRAWING FIGURES

FIG. 3 is a perspective view of a reusable food container according to our invention with the rear wall and side walls partially cutaway.

FIG. 4 is a perspective view of the three reusable food containers according to our invention stacked and interlocked for storage.

FIG. 5 is a detailed perspective cutaway view of a corner of a reusable container according to our invention with optional heat retention plate mounted inside it.

FIG. 6 is a perspective view showing how two separate interlocked vertical stacks of containers according to our invention can be interlocked laterally for storage.

FIG. 7 is a top plan view showing two reusable containers according to our invention interlocked in storage with arrows showing how they separate.

DETAILED DESCRIPTION OF THE INVENTION

Figure 1:
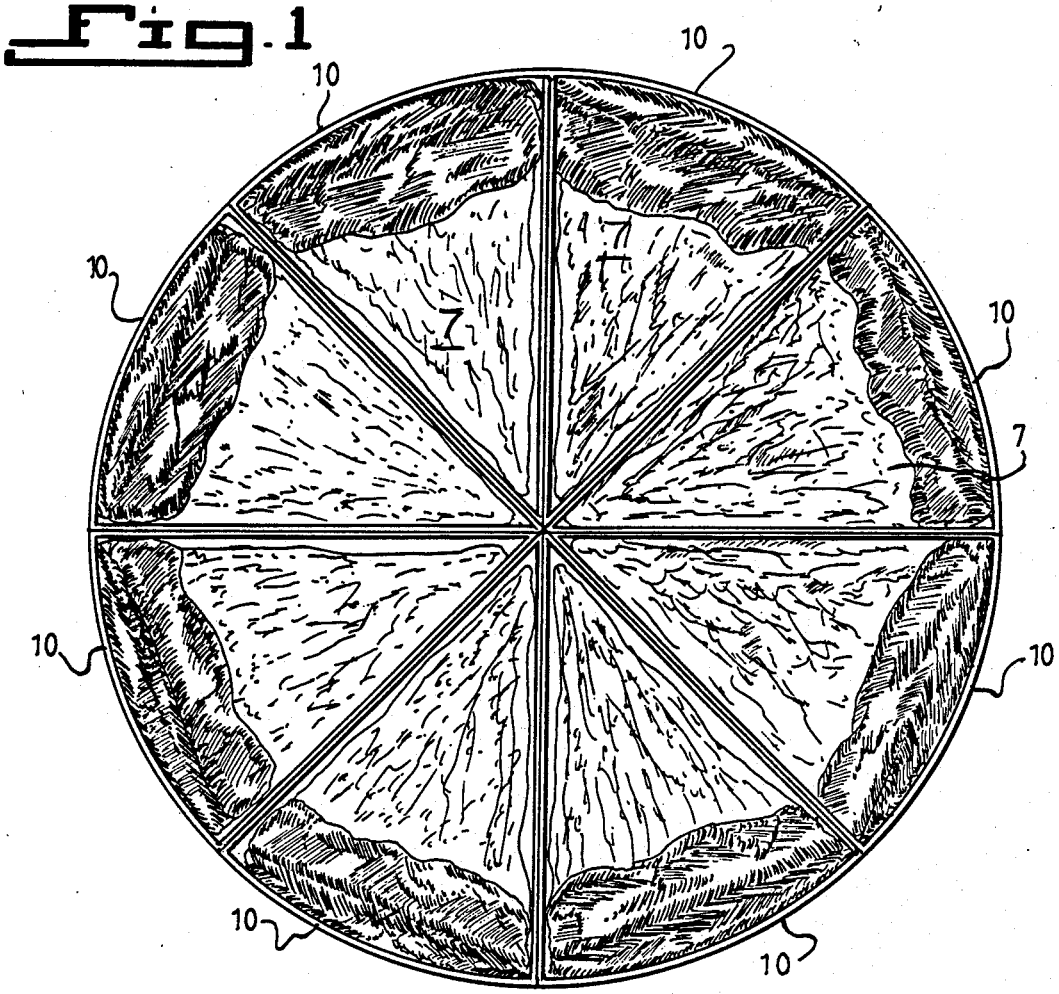
FIG. 1 is a top plan view of eight interlocked reusable food containers according to our invention useful for storing pizza.

An individual interlockable reusable container 10 for storing leftover food products, especially a piece of pizza pie 7, is shown particularly in FIGS. 3 and 5. The other drawing figures show how these containers 10 are interlocked to store pizza pieces 7 as efficiently as possible.

The reusable interlockable container 10 shown in FIG. 3 is designed for a leftover piece 7 of a circular pizza pie which is cut in the shape of a sector of a circle. The cross section of the container 10 taken in a substantially horizontal plane is therefore in the shape of a sector of a circle and the size of the container 10 is such that the piece of a pizza pie 7 fits in the container 10. In practice there are several sizes for pizza pies having different radii, R. Furthermore the pizza pie can be cut in a variety of ways so that it can have pieces of a variety of arc length, S, although the standard pizza pie is usually cut into eight pieces with an approximately 45 degree angle between the edges of a piece. Thus a number of different size containers would be needed in practice. These reusable containers 10 would have different radii R and arc length S. Some variation in arc length S could be accommodated however by folding the edges of the piece of pizza pie 7 or by using a container which has a bigger arc length S than that of the piece of pizza pie 7.

The reusable container 10 comprises a base 14 which is approximately the size and shape of the piece of pizza pie 7 it is to store, advantageously slightly larger, substantially rectangular side walls 14 and 18 attached to the base 14, a curved rear wall 16 attached to the side walls 14 and 18 and the base 14 and a removable lid 20 which rests on the walls when in place on the container.

The container 10 can be made of a variety of materials but is advantageously made from a thermoplastic material which can be subjected to a moderate heating to heat the leftover food contained in it, especially in a microwave oven.

The interlockable reusable container 10 of course has only three walls and is nearly triangular in cross section with only the rear wall 16 being curved and with the side walls 12 and 18 being attached at a common vertex 15.

A key feature of the reusable container 10 shown in FIGS. 3 and 5 is that it can be laterally interlocked with other reusable containers 10. For this purpose the side wall 12 of each container 10 is provided with an exterior straight tongue member 28 extending laterally along the outer surface of the side wall 12 and the side wall 18 is formed with a corresponding exterior groove member 30 shaped to engage and hold the tongue member 28 on the side wall 12 of an adjacent container 10. This system of interlocking tongue and groove members allows the eight reusable containers 10 shown in FIG. 1 to be assembled and interlocked into an entire pie shaped unit.

Not only do the reusable containers 10 of FIGS. 3 and 5 laterally interlock but they can be stacked vertically as well. The lid 20 comprises a lid panel 20' which is the exact size of the container 10, a plug member 22 attached to the bottom side of the lid panel 20' which fits snugly in the top opening of the container 10 and which prevents the lid 20 from slipping off the container 10 when it is in place and a vertically extending peripherally running tongue piece 24. By "peripherally running" we mean here extending along the edge of the lip panel 20' on its exterior surface adjacent the peripheral edge. Furthermore the base 14 of the container 10 has a peripherally running groove portion 26 exactly corresponding to the vertically extending peripheral tongue piece 24 on its exterior bottom side. When the containers 10 are stacked one on top of the other the vertically extending peripherally running tongue piece 24 on the lid 20 of the container 10 engages in the peripherally running groove portion 26 in the base 14 of the container 10 immediately above it. Thus the containers 10 are interlocked will not slip from each other when they are stacked as shown in FIGS. 4 and 6.

When a piece of pizza pie 7 is stored in the container 10, the container 10 would usually be kept in the refrigerator if a comparatively long storage period was contemplated but could be used to store the pizza pie piece 7 temporarily on the counter or to transport it. If a leftover piece is to be heated the container can provide a convenient vessel in which the reheating takes place. Then an optional heat retention plate 34 can be placed in the bottom of the container 10 as shown in FIG. 5 before the piece of pizza pie 7 is put in. This heat retention plate 34 can conveniently be made of a ceramic material for easy cleaning and heat insulation ability with feet members 38 underneath it to elevate it from the base 14 of the container to minimize heat loss. The container 10 with the heat retention plate 34 and the piece of pizza pie 7 can be placed in a microwave oven for rapid convenient reheating.

Figure 2:
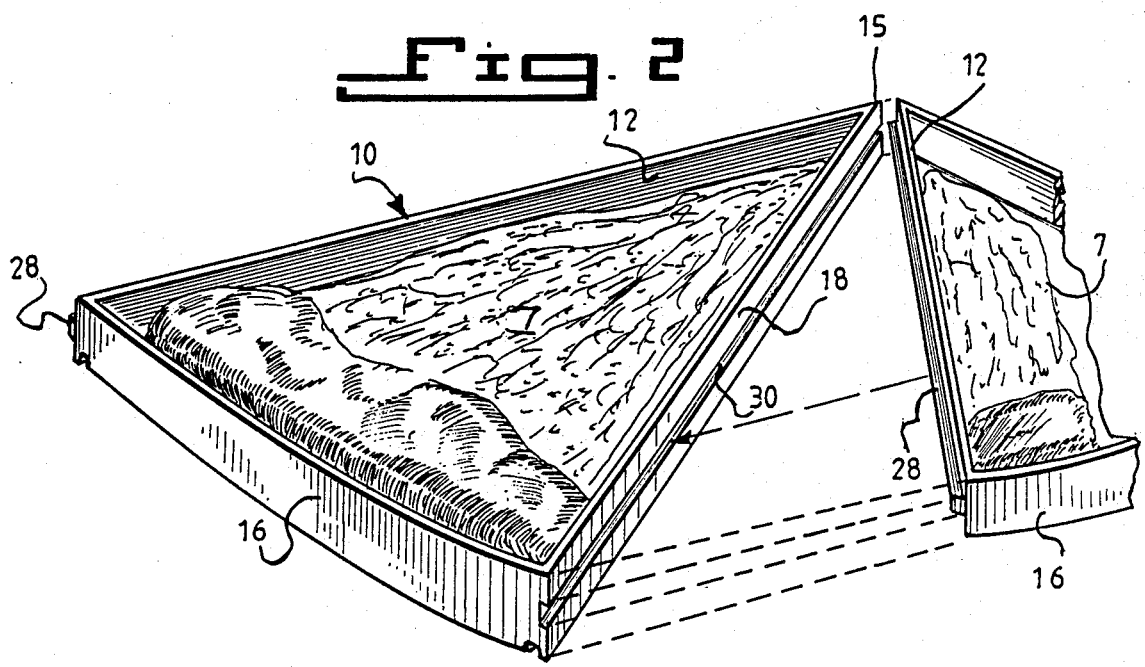
FIG. 2 is a perspective view of two reusable food containers according to our invention each containing a piece of pizza pie in the process of being interlocked for storage.

In operation two reusable containers 10 can be interlocked laterally as shown in FIG. 2. The side wall 12 with the tongue member 28 on one container 10 is moved toward the side wall 18 with the corresponding groove member 30 of the other container 10 and the two side walls 12,18 are pressed together so that the tongue member engages in the groove member 30. In this way if eight pieces of pizza pie 7 are to be stored in a crowded refrigerator eight of the containers can be interlocked laterally as shown in FIG. 1 so that a container only about one inch high can effectively preserve all eight leftover pieces of pizza with a minimum of space consumption.

Similarly when three pieces of leftover pizza pie 7 are to be stored as seen in FIG. 4 three containers 10 containing the pieces can be stacked vertically and interlocked. The vertically extending peripherally running tongue piece 24 of two of these containers engages in the groove portion 26 in the base 14 of the container 10 immediately above it. FIG. 6 shows a different way of storing eight pieces of pizza. Two vertical stacks of four containers 40,41 are interlocked laterally. How these stacks or else two containers 10 can be separated occurs is further illustrated in FIG. 7.

LIST OF REFERENCE NUMBERS 7 piece of pizza pie
10 reusable container
12 side wall
14 base
15 vertex
16 rear wall
18 side wall
20 lid
20' lid panel
22 plug member
24 tongue member
26 groove member
28 tongue piece on side wall 12
30 groove portion on side wall 18
34 heat retention plate
38 feet members for heat retention plate
40 vertical stack of three containers 10
41 vertical stack of three containers 10

It will be understood that each of the elements described above, or two or more together, may also find a useful application in other devices differing from the type of device described above.

The invention is not intended to be limited to the details provided above and it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention.

What is claimed is new and what is desired to be protected by Letters Patent is set forth in the following claims:

1. An interlockable reusable container for a food product, especially for a leftover piece of pizza pie, comprising:
    (a) a base shaped like the sector of a circle;
    (b) two substantially flat side walls attached to said base and meeting in a common vertex;
    (c) a rear wall attached to said side walls and said base;
    (d) an exterior tongue member and/or tongue piece; and
    (e) an exterior groove member and/or groove portion shaped to engage said tongue member or tongue piece on another of said reusable containers so that said reusable containers may be interlocked, said groove member extending along one of said side walls and said tongue member extending along the other of said side walls, said groove member being conformed according to said tongue member so that said reusable container can be laterally interlocked with another of said reusable containers to form a substantially flat package capable of holding two of said pieces of pizza pie, said reusable containers being made of a thermoplastic material which withstands a moderate heating necessary to warm a leftover food product for palatability and efficient digestion;
    (f) a heat retention plate having a plurality of feet members shaped so just fit in said reusable container resting on said base of said reusable container with said feed members, said heat retention plate being made of a ceramic material
    (g) a removable lid which rests on said side walls when used to cover said container, said removable lid comprises a lid panel which rests on said side walls, a plug member underneath said lid panel which fits snugly in the top opening of said reusable container when said lid is in place on said container, said lid panel having a peripherally running vertically extending one of said tongue pieces and said base having a corresponding peripherally running one of said groove portions, said tongue piece and said groove portion being so formed and positioned that two or more of said reusable containers can be interlocked and stacked vertically.

2. An interlockable reusable container for a food product, especially for a leftover piece of pizza pie, made of a thermoplastic material comprising:
    a base shaped like the sector of a circle,
    two substantially flat side walls attached to said base meeting in a common vertex, one of said side walls having an exterior tongue member and the other of said side walls having an exterior groove member corresponding to said tongue member shaped so that said reusable container is laterally interlockable with another of said reusable containers, a rear wall attached to said side walls and said base,
    a removable lid positionable on said side walls having a lid panel which rests on said side walls, a plug member which fits in the top opening of said reusable container when said lid is in place on said container, said lid panel having a peripherally running vertically extending exterior tongue piece and said base having a corresponding peripherally running exterior groove portion, said tongue piece and said groove portion being so formed that two or more of said reusable containers can be stacked vertically to form interlocked vertical reusable container stacks, and
    a ceramic heat retention plate having a plurality of feet members shaped to just fit in said reusable container resting on said base of said reusable container with said feet members.

* * * * *